United States Patent [19]
Sasa et al.

[11] Patent Number: 4,904,001
[45] Date of Patent: * Feb. 27, 1990

[54] FLUID COUPLING

[75] Inventors: Takeya Sasa; Yoshikazu Kobayashi; Reichi Makishima, all of Tokyo, Japan

[73] Assignee: Nitto Kohki Co., Ltd., Tokyo, Japan

[*] Notice: The portion of the term of this patent subsequent to Feb. 27, 2007 has been disclaimed.

[21] Appl. No.: 268,721

[22] Filed: Nov. 8, 1988

[30] Foreign Application Priority Data

Nov. 10, 1987 [JP] Japan .............................. 62-171802[U]

[51] Int. Cl.⁴ .............................................. F16L 37/22
[52] U.S. Cl. ..................................... 285/316; 285/318; 285/362; 285/903
[58] Field of Search ............... 285/362, 395, 903, 318, 285/91, 82, 314, 315, 316, 361; 403/104, 369, 366

[56] References Cited

U.S. PATENT DOCUMENTS

| 1,710,416 | 4/1929 | Goeller | 403/369 X |
| 1,738,216 | 12/1929 | Wallace | 285/82 |
| 2,503,169 | 4/1950 | Phillips . | |
| 2,731,058 | 1/1956 | Smisko | 285/82 X |
| 2,961,630 | 11/1960 | Duncan | 285/82 X |
| 3,425,026 | 1/1969 | Theunissen | 285/362 X |
| 3,635,501 | 1/1972 | Thorne-Thomsen | 285/81 X |
| 3,649,052 | 3/1972 | Snyder Jr. . | |
| 3,871,691 | 3/1975 | Takagi et al. . | |
| 3,934,902 | 1/1976 | McNamee . | |
| 4,014,467 | 3/1977 | Ferguson | 285/316 X |
| 4,437,691 | 3/1984 | Laney . | |
| 4,630,850 | 12/1986 | Saka | 285/322 |
| 4,674,775 | 6/1987 | Tajima | 285/322 |

FOREIGN PATENT DOCUMENTS

| 0009853 | 1/1907 | Denmark | 285/362 |
| 0222051 | 5/1987 | European Pat. Off. | 285/331 |
| 2110550 | 9/1972 | Fed. Rep. of Germany . | |
| 2624521 | 12/1976 | Fed. Rep. of Germany | 285/361 |
| 1101782 | 10/1955 | France . | |
| 1146672 | 11/1957 | France | 285/361 |
| 9-13915 | of 1934 | Japan . | |
| 49-31783 | 8/1974 | Japan . | |
| 55-50460 | 11/1980 | Japan . | |
| 58-94988 | 6/1983 | Japan . | |
| 62-32290 | 2/1987 | Japan . | |
| 62-51916 | 3/1987 | Japan . | |
| 0004240 | of 1911 | United Kingdom | 285/81 |
| 4240 | of 1911 | United Kingdom . | |
| 1371609 | 10/1974 | United Kingdom . | |

Primary Examiner—Randolph A. Reese
Assistant Examiner—Anthony Knight
Attorney, Agent, or Firm—Nixon & Vanderhye

[57] ABSTRACT

A fluid coupling comprising a coupling body having a cylindrical outer peripheral surface, clamp means for radially and inwardly clamping the outer peripheral surface of an end portion of a pipe, the clamp means beig axially immovable with respect to the pipe, a sleeve having engaging means and slidably fitted on the cylindrical outer peripheral surface of the coupling body, the engaging means being capable of axially moving the clamp means, a spiral guide groove formed on one of the sleeve and the outer peripheral surface of the coupling body, a pin member formed on the other of the sleeve and the outer peripheral surface of the coupling body and slidable along the guide groove, and means for preventing the sleeve and the coupling body from rotating relative to each other at a position reached when the sleeve is moved axially a predetermined distance, as the pin member is guided along the guide groove.

5 Claims, 5 Drawing Sheets

FLUID COUPLING

BACKGROUND OF THE INVENTION

1. Field of the Invention

The present invention relates to fluid coupling having a fixing mechanism which fixes a pipe inserted in a cylindrical coupling body by retreating a sleeve slidably mounted on the body, and more particularly, to a fluid coupling capable of fixing the sleeve in a retreated position, thereby preventing the pipe from slipping out of the fluid coupling.

2. Description of the Related Art

Fluid couplings are conventionally manufactured and used to connect pipes. Many of them are constructed so that a pipe can be fixed to a cylindrical body by operating a sleeve fitted on the body. In order to maintain the connection or the fixed state of the pipe, the fluid couplings of this type require use of fixing means for preventing the sleeve from moving in this state. Generally, in these fluid couplings, the sleeve is designed so as to move straight on the cylindrical body, in the axial direction thereof, so that it cannot be easily fixed. Most of conventional sleeve fixing means utilizes the resilience of a spring for the fixation.

According to the prior art fluid couplings described above, the sleeve can be duly fixed. If it is subjected to any external force greater than the resilient force of the fixing spring, however, the sleeve may possibly move against the urging force of the spring, thereby allowing the pipe to be disengaged therefrom and slip out of the cylindrical body. Thus, these fluid couplings are not suited for applications in which disengagement of the pipe involves a danger. In order to fix the sleeve more securely without using the spring, moreover, the construction of the fluid couplings must be so complicated that it requires troublesome operations. Thus, the conventional fluid couplings cannot enjoy a high operating efficiency, and their manufacture is a hard task, entailing high costs.

SUMMARY OF THE INVENTION

The object of the present invention is to provide a fluid coupling free of the aforementioned problems, capable of securely fixing a pipe with ease, and enjoying low manufacturing costs.

In order to achieve the above object, according to the present invention, there is provided a fluid coupling which comprises: a coupling body having first and second end portions, an axial through hole, and a cylindrical outer peripheral surface arranged on the first end portion side, the through hole including a pipe insertion portion arranged on the first end portion side and a fluid passage portion arranged on the second end portion side; clamp means for radially inwardly clamping, with a circumferentially uniform force, the outer peripheral surface of an end portion of a pipe inserted in the pipe insertion portion, the clamp means being axially immovable with respect to the pipe; a sleeve having first and second end portions and engaging means, and slidably mounted on the cylindrical outer peripheral surface of the coupling body, the engaging means being capable of moving the clamp means toward the second end portion of the coupling body; a pair of spiral guide grooves formed on one of the sleeve and the outer peripheral surface of the coupling body; a pair of pin members formed on the other of the sleeve and the outer peripheral surface of the coupling body and slidable along the guide groove; and means for preventing the sleeve and the coupling body from rotating relatively to each other at a position reached when the sleeve is moved for a predetermined distance from the first end portion of the coupling body to the second end portion, as the pin member is guided along the guide groove.

According to the present invention, the spiral guide grooves are formed on one of the outer peripheral surface of the coupling body or the sleeve, while the pin members are formed on the other. If the sleeve is rotated, in this arrangement, it is guided by the guide grooves to rotate spirally, thus moving axially or in the thrusting direction on the coupling body. When the sleeve reaches its full-back position, after having moved for the predetermined distance from the first end portion of the coupling body to the second end portion, while rotating, the sleeve and the coupling body are prevented from relative rotation by the preventing means. In this manner, the sleeve is fixed in the full-back position.

Thus, the fluid coupling of the present invention is provided with a fixing mechanism for fixing the pipe which is connected to the coupling body by moving the sleeve fitted on the body. In this arrangement, the sleeve cannot be unexpectedly moved to allow the pipe to be disengaged. Therefore, the pipe can never slip out of the coupling body. In consequence, the fluid coupling of the invention is safe enough to be applied, for example, to the connection of indoor gas pipes for household use, in which disengagement of the pipe may involve a danger. Also, the fluid coupling has so simple a construction that it is easy to handle, and can be readily manufactured at low cost.

DETAILED DESCRIPTION OF THE PREFERRED EMBODIMENTS

Although preferred embodiments of the present invention will now be described in detail with reference to the accompanying drawings, it is to be understood that the invention is not limited to those precise embodiments.

Figure 9:
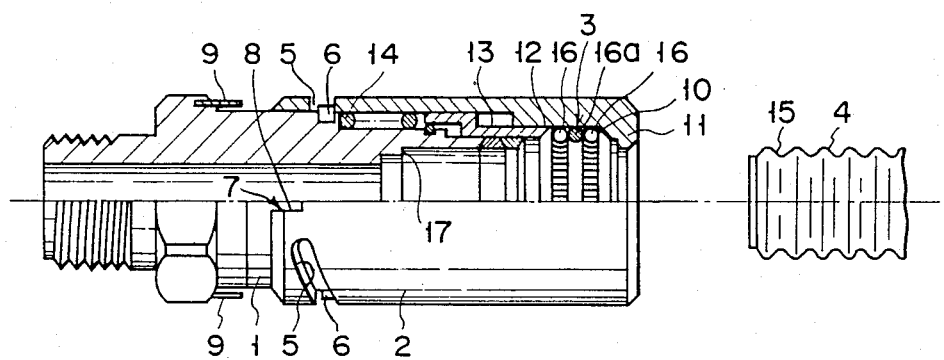
FIG. 9 is a side view, partially in longitudinal section, showing a modification of the fluid coupling shown in FIG. 1.
Figure 10:
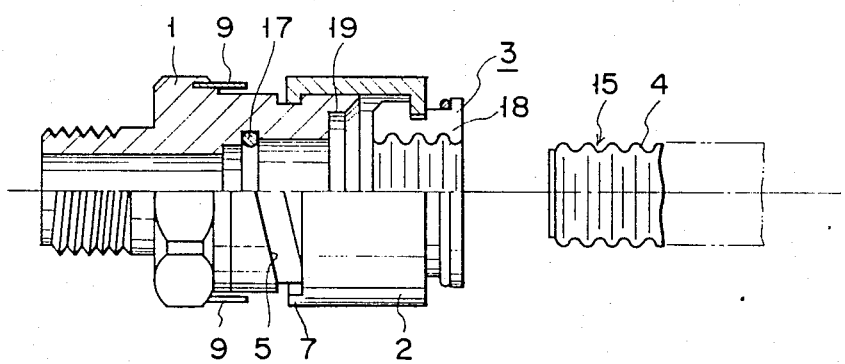
FIG. 10 is a side view, partially in longitudinal section, showing a modification of the fluid coupling shown in FIG. 5.

In these drawings, numeral 1 designates a cylindrical coupling body which, preferably made of metal, constitutes a fluid coupling. Body 1 has an axial through hole which includes a pipe insertion portion and a fluid passage portion (FIGS. 9 and 10). A male thread, which can threadedly engage an ordinary gas pipe or the like, is formed at a second end portion (right-hand portion in FIGS. 1 to 8; left-hand portion in FIGS. 9 and 19) of body 1. Numeral 2 designates a sleeve which is mounted on a first end portion of cylindrical body 1 for axial movement. As sleeve 2 is retreated or moved toward the second end portion, clamp means 3 shown in FIGS. 9 and 10 is actuated to fix metallic corrugated pipe 4, e.g., a gas pipe, which is connected to cylindrical body 1. Numerals 5 designate a spiral guide grooves formed on sleeve 2, while numerals 6 denote engaging pins formed on the outer peripheral surface of body 1. Each pin 6 is in engagement with a corresponding guide groove 5. If sleeve 2 is rotated, it is guided by grooves 5 to rotate spirally, thus moving axially or in the thrusting direction on cylindrical body 1, from the first end side thereof toward the second end side. When sleeve 2 reaches its full-back position, it is prevented from rotating relatively to body 1 by rotation preventing means.

Figure 1:
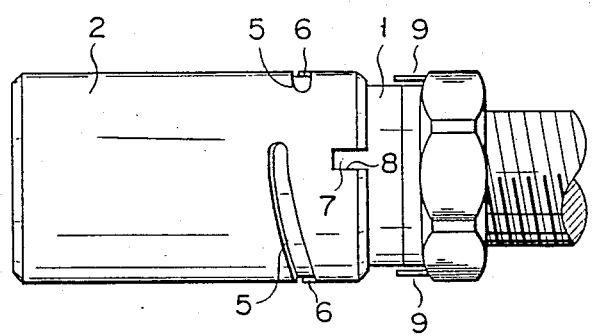
FIG. 1 is a side view showing an embodiment of the present invention.
Figure 2:
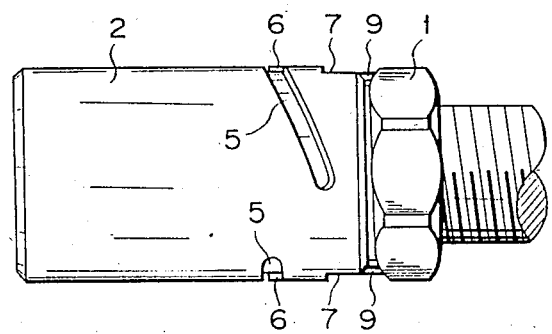
FIG. 2 is a side view showing an arrangement in which a sleeve of a fluid coupling shown in FIG. 1 is fixed in its full-back position.
Figure 3:
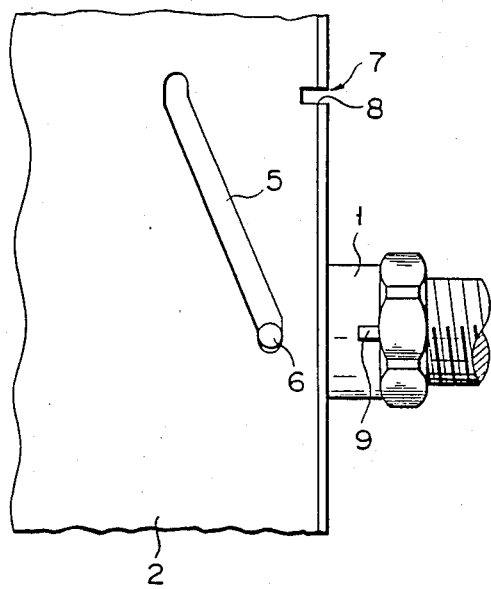
FIG. 3 is a development of FIG. 1.
Figure 4:
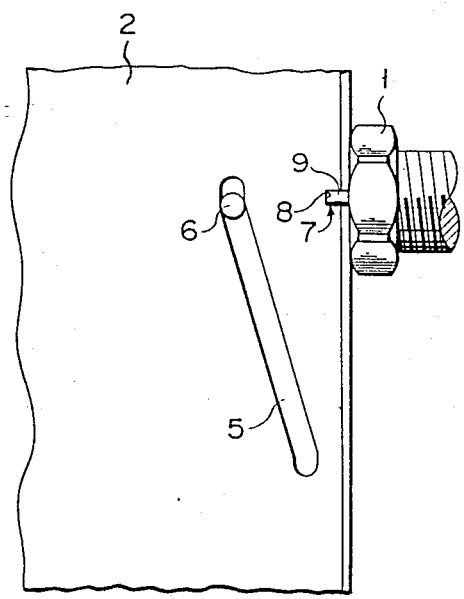
FIG. 4 is a development of FIG. 2.

In an embodiment shown in FIG. 1 to 4, the rotation preventing means includes engaging portions 7 at the rear end of sleeve 2 and stoppers 9 of a resilient material, which are formed on cylindrical body 1 so as to face the sleeve. Engaging portions 7 have engaging surfaces 8 on the leading side of rotation of sleeve 2 for advance or movement toward the front end side. Stoppers or leaf springs 9 are adapted to run on the rear end of sleeve 2 moved rearward or to the rear end side by rotation, and to engage respective surfaces 8 of engaging portions 7, at the rear end of the sleeve, when the sleeve is in the full-back position. As stoppers 9 engage engaging surfaces 8 in this manner, sleeve 2 is prevented from rotating for the advance or the movement toward the front end side, so that it is fixed in the full-back position. In FIG. 1, showing the fluid couplng according to the aforementioned embodiment, sleeve 2 is situated on the front end side. In FIG. 2, sleeve 2 of the fluid coupling shown in FIG. 1 is retreated to and fixed in its full-back position so that stoppers 9 are in engagement with engaging surfaces 8 of engaging portions 7 of the sleeve.

If stopper 9 is disengaged from engaging surface 8 of engaging portion 7 by utilizing the elasticity of stopper 9, sleeve 2 can be disengaged from coupling body 1. More specifically, when sleeve 2 is to be engaged to coupling body 1, the end portion of stopper 9 is pushed out by the taper as sleeve 2 rotates, resulting in that stopper 9 rides onto sleeve 2. Subsequently, when stopper 9 is engaged with engaging surface 8 of engaging portion 7, the sleeve 2 is prevented from further rotation. When sleeve 2 is to be disengaged from coupling body 1, the operator has only to push up and disengage stopper 9 from engaging surface 8 by means of the top of a screwdriver or the like. In this state, if sleeve 2 is rotated in the reverse, it can be disengaged from coupling body 1.

Figure 5:
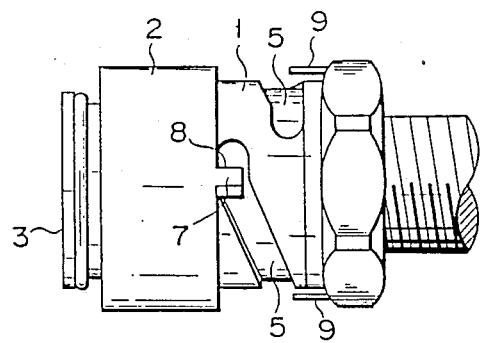
FIG. 5 is a side view showing another embodiment of the invention.
Figure 6:
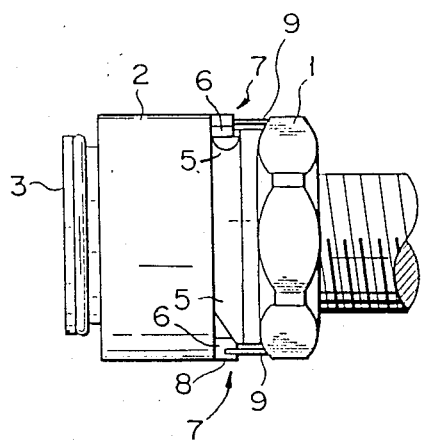
FIG. 6 is a side view showing an arrangement in which a sleeve of a fluid coupling shown in FIG. 5 is fixed in its full-back position.
Figure 7:
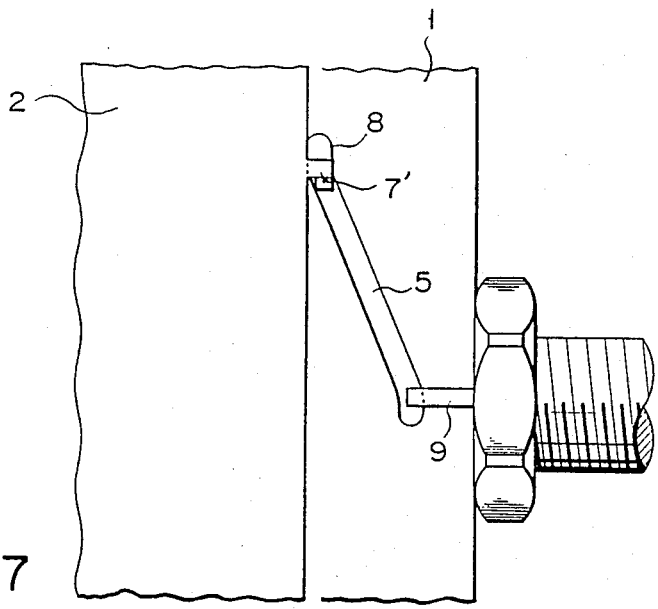
FIG. 7 is a development of FIG. 5.
Figure 8:
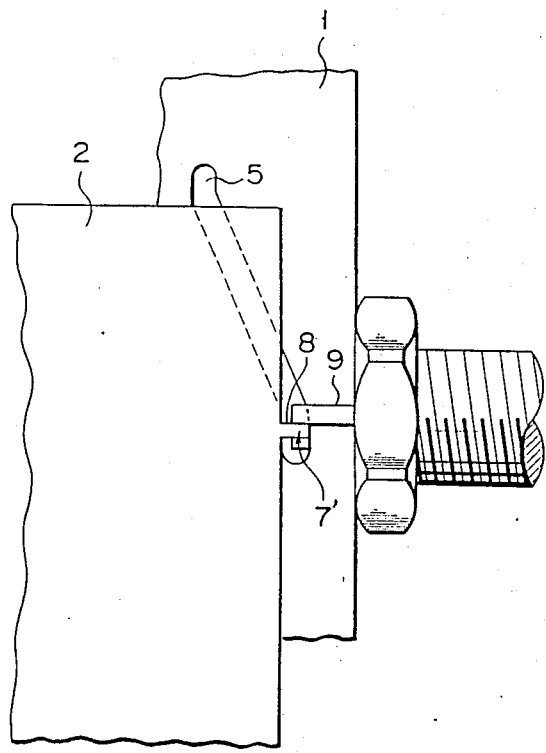
FIG. 8 is a development of FIG. 6.

FIG. 5 shows another embodiment of the present invention. In this embodiment, spiral guide grooves 5 are formed on the outer peripheral surface of cylindrical body 1, and engaging pins 6 are formed on sleeve 2 so that they can be fitted in grooves 5. In the arrangement shown in FIG. 1, engaging portion 7 at the rear end of sleeve 2 are formed as recesses. In the embodiment shown in FIG. 5, however, engaging pins 6, which protrude from the rear end of sleeve 2, also serve as engaging portions 7. In FIG. 6, sleeve 2 of the fluid coupling shown in FIG. 1 is retreated to and fixed in its full-back position so that stoppers 9 are in engagement with engaging surfaces 8 of engaging portions 7 of the sleeve.

FIG. 9 shows a modification of the fluid coupling shown in FIG. 1. In this arrangement, the fluid coupling is provided with clamp means 3 for fixing connected corrugated pipe 4 which is connected to cylindrical body 1 by retreating sleeve 2 fitted on body 1.

Clamp means 3, used to connectedly fix the corrugated pipe 4 inserted in cylindrical body 1, includes taper surface 10, collar portion 11, intermediate cylinder 13, spring 14, ring-shaped spring members or engaging bodies 16, and spacer ring 16a sandwiched between engaging bodies 16, 16. Taper surface 10, which is formed on the inner peripheral surface of the front end portion of sleeve 2, is slanted centripetally toward the front end side. Collar portion 11 protrudes continuously inward from surface 10. Cylinder 13 is slidably fitted between the outer peripheral surface of the front end portion of cylindrical body 1 and the inner peripheral surface of the front end portion of second sleeve 2. The front end of cylinder 13 constitutes taper surface 12 which is slanted oppositely to taper surface 10 of sleeve 2, and faces surface 10. Spring 14, which is interposed between cylinder 13 and cylindrical body 1, urges cylinder 13 so that the front end of cylinder 13 projects from the front end of body 1. Engaging bodies 16, which are situated between taper surfaces 10 and 12 of sleeve 2 and cylinder 13, inside the sleeve, can expand and contract in the radial direction. When they are contracted by taper surfaces 10 and 12, bodies 16 engage root portions 15 of corrugated pipe 4 which is inserted in cylindrical body 1. Spacer ring 16a prevents top portion, between root portions 15, 15, from being collapsed by engaging bodies 16, 16.

Further, seal portion 17 is disposed inside cylindrical body 1. It is pressed, for sealing, against the front end portion of corrugated pipe 4 which advances in engagement with engaging bodies 16. If sleeve 2 is rotated to be retreated after pipe 4 is inserted into cylindrical body 1, intermediate cylinder 13 retreats against the urging force of spring 14, so that engaging bodies 16 move in the same direction. As bodies 16 move in this manner, pipe 4, having its outer peripheral surface engagedly pressed thereby, is moved in the same direction. Thus, the front end of pipe 4 is pressed against seal portion 17 inside cylindrical body 1, to be sealed thereby.

When sleeve 2 reaches its full-back position in this manner, corrugated pipe 4 is fixed and sealed, and stopper 9 on cylindrical body 1 engages engaging surface 8 of engaging portion 7 at the rear end of sleeve 2. As a result, sleeve 2 is prevented from rotating to advance or move toward the front end side, so that pipe 4 is kept connected to cylindrical body 1 in a sealed state.

FIG. 10 shows a modification of the fluid coupling shown in FIG. 5. In this arrangement, the fluid coupling is provided with clamp means 3 for securely connecting corrugated pipe 4 which is inserted in cylindrical body 1 by retreating sleeve 2 fitted on body 1.

Clamp means 3, used to connectedly fix the corrugated pipe 4 inserted in cylindrical body 1, includes cylindrical chuck 18, fitted in the front end portion of body 1, and chuck holding portion 19. Chuck 18, which is circumferentially divided into two or more segments, has an internal profile mating with the external profile of corrugated pipe 4, which is inserted in cylindrical body 1. Holding portion 19, which is formed at the front end portion of body 1, serves to narrow chuck 18 centripetally. Sleeve 2 is slidably mounted on cylindrical body 1. Chuck 18 is contractibly supported by the inner peripheral surface of the front end portion of sleeve 2 so that it can be fitted in chuck holding portion 19 of body 1. Further, cylindrical body 1 is provided with seal portion 17. Seal portion 17 is pressed, for sealing, against the front end portion of corrugated pipe 4 which is inserted in body 1 so that its outer peripheral surface is pressed by chuck 18.

If sleeve 2 is rotated to be retreated after corrugated pipe 4 is inserted into cylindrical body 1, chuck 18 is fitted into chuck holding portion 19 at the front end portion of body 1, and is centripetally narrowed. Thereupon, the inner surface of chuck 18, whose internal profile mates with the external profile of pipe 4, is pressed against the outer peripheral surface of pipe 4 inserted in the chuck. Thus, pipe 4 is prevented from slipping out of cylindrical body 1. As chuck 18 is moved in the same direction as sleeve 2 by the movement of the sleeve, corrugated pipe 4, having its outer peripheral surface engagedly pressed by the chuck, is moved in the same direction. Thus, the front end of pipe 4 is pressed against seal portion 17 inside cylindrical body 1, to be sealed thereby.

When sleeve 2 reaches its full-back position in this manner, corrugated pipe 4 is fixed and sealed, and stopper 9 on cylindrical body 1 engages engaging surface 8 of engaging portion 7 at the rear end of sleeve 2. As a result, sleeve 2 is prevented from rotating to advance or move toward the front end side, so that pipe 4 is kept connected to cylindrical body 1 in a sealed state.

What is claimed is:

1. A fluid coupling comprising:
    a coupling body having first and second end portions, an axial through hole, and a cylindrical outer peripheral surface arranged on the first end portion side, said through hole including a pipe insertion portion arranged on the first end portion side and a fluid passage portion arranged on the second end portion side;
    clamp means for radially and inwardly clamping, with a circumferentially uniform force, an outer peripheral surface of an end portion of a pipe inserted in the pipe insertion portion, said clamp means being axially immovable with respect to the pipe;
    a sleeve having first and second end portions and engaging means, and slidably mounted on the cylindrical outer peripheral surface of the coupling body, said engaging means being capable of moving the clamp means toward the second end portion of the coupling body;
    a spiral guide groove formed on one of the sleeve or the outer peripheral surface of the coupling body, both ends of said spiral guide groove being closed;
    a pin member formed on the other of the sleeve or the outer peripheral surface of the coupling body and slidable along the guide groove;
    rotation preventing means for engaging a plate like resilient stopper member with an engaging surface after said stopper member has run onto the second end portion of said sleeve at a position where the sleeve is moved for a predetermined distance from the first end portion of the coupling body to the second end portion as the pin member is guided along the guide groove, thereby preventing the sleeve and the coupling body from rotating further relative to each other at said position.

2. The fluid coupling according to claim 1, wherein said pipe insertion portion is adapted to receive a corrugated pipe end, said coupling further comprising an additional sleeve disposed between the coupling body and the sleeve so as to be slidable relatively thereto, said additional sleeve being urged toward the first end portion of the coupling body, and wherein said clamp means includes at least one resilient ring member disposed between one end of the additional sleeve and the engaging means, having a diameter greater than the diameter of a top portion of a corrugation of the pipe, and reducible to the diameter of a root portion of the corrugation, and said engaging means includes a collar portion having a taper surface formed inside, with respect to the axial direction, said taper surface being adapted to contact the resilient ring member when the sleeve moves toward the second end portion of the connector body.

3. The fluid coupling according to claim 1, wherein said engaging means includes a collar portion protruding radially inward from the first end portion of the sleeve, and said clamp means has at least two circumferentially divided segments, an axial through hole adapted to mate with an external configuration of a corrugated pipe when the segments are assembled, an outside diameter such that at least part of the clamp means can be inserted into the pipe insertion portion, and an engaging groove adapted to engage the collar portion.

4. The fluid coupling according to claim 1, wherein said engaging surface is formed on the wall surface of a recess on the second end portion of said sleeve.

5. The fluid coupling according to claim 1, wherein said engaging surface is formed on the wall surface of a projection on the second end portion of said sleeve.

* * * * *